United States Patent [19]

Farmakis

[11] Patent Number: 5,242,291
[45] Date of Patent: Sep. 7, 1993

[54] CONFECTION MOLDING MACHINE

[76] Inventor: John Farmakis, 354 Victory Dr., Sharpsville, Pa. 16150

[21] Appl. No.: 786,569

[22] Filed: Nov. 1, 1991

[51] Int. Cl.⁵ .......................... A23G 1/21; A23G 1/26
[52] U.S. Cl. .................................. 425/215; 425/261; 425/442; 425/453; 425/552; 426/515; 426/660
[58] Field of Search ............... 425/215, 4 R, 130, 246, 425/259, 220, 442, 444, 100, 195, 99, 506, 261, 432, 576, 145, 552, 157, 453; 264/39; 249/129; 426/506, 515, 524, 660

[56] References Cited

U.S. PATENT DOCUMENTS

| | | | |
|---|---|---|---|
| 927,435 | 7/1909 | Sigrist | 426/506 |
| 993,321 | 5/1911 | Coddington | 425/100 |
| 1,581,773 | 4/1926 | Williams | 425/215 |
| 1,783,402 | 12/1930 | Cahoon | 425/195 |
| 1,840,438 | 1/1932 | Faure | 425/99 |
| 1,904,071 | 4/1933 | Nelles | 425/261 |
| 2,032,812 | 3/1936 | Quattrin et al. | 425/100 |
| 2,098,753 | 11/1937 | Mulch | 425/261 |
| 2,780,832 | 2/1957 | Schmitt et al. | 425/444 |
| 2,983,983 | 5/1961 | Mayer | 249/129 |
| 3,276,398 | 10/1966 | Lampros et al. | 425/432 |
| 3,632,245 | 1/1972 | Getman | 425/130 |
| 3,957,411 | 5/1976 | Schiesser | 425/215 |
| 4,025,268 | 5/1977 | Taylor | 425/256 |
| 4,038,007 | 7/1977 | Griner et al. | 425/259 |
| 4,486,367 | 12/1984 | Shimomura | 264/39 |
| 4,548,573 | 10/1985 | Waldstrom | 425/442 |
| 4,671,753 | 6/1987 | Payne | 425/4 R |
| 4,832,587 | 5/1989 | Rensen | 425/99 |
| 5,139,602 | 8/1992 | Suda et al. | 425/215 |

*Primary Examiner*—Jay H. Woo
*Assistant Examiner*—Joseph Leyson
*Attorney, Agent, or Firm*—Webb, Burden, Ziesenheim & Webb

[57] ABSTRACT

A confection molding machine provides for continuous, multiple cavity molding and unmolding of confection figures which may be of differing configuration and mass. The mold device utilizes a self-closing and opening mold in conjunction with dedicated, independent injection nozzles and confection pumps. Two outwardly facing mold halves are carried on an independent mold assembly, and corresponding mold halves abut one another just before filling and again after unmolding the finished confection figure. An endless conveyor, preferably a pair of spaced transfer chains, carries the mold assemblies and the mold halves are clamped together when passing over an unsupported section of the endless conveyor.

14 Claims, 7 Drawing Sheets

CONFECTION MOLDING MACHINE

BACKGROUND OF THE INVENTION

This application is commonly owned with U.S. patent application Ser. No. 07/310,544, now abandoned.

1. Field of the Invention

This invention relates to confection molding machines of the type that utilize liquid confection injected into pre-shaped, multiple cavity molds to produce a predetermined confection figure.

2. Description of the Prior Art

In U.S. Pat. No. 1,783,402, a chocolate molding machine is disclosed using a continuous chain having a plurality of transversely arranged molds thereon. The molds are of the open tray type that have a single design or impression on the bottom. Chocolate is deposited in the tray mold, cooled and then ejected.

In U.S. Pat. No. 1,904,071 to Nelles, a soap molding machine is disclosed which uses an endless belt conveyor to transport molds comprised of sheet material forming an elongated trough having multiple, spaced dividers which define separate bars of molded soap.

U.S. Pat. No. 2,032,812 discloses a confection making apparatus having an endless belt with multi-cavity molds and aligned injection nozzles for dispensing the confection into the mold cavities.

In U.S. Pat. No. 3,276,398 to Lampros, et al., a confection figure making machine is disclosed using a complex mold block having two elongated inner and outer mold sections hinged together along their respective bottom edges. The mold is positioned in a filling station, injecting a pair of oppositely disposed cavities at the same time. Once filled, the mold travels on a conveyor to cool and is removed at an unloading station where it is opened manually and the figures are discharged. The open mold is then placed on an adjoining conveyor to return to the filling station.

U.S. Pat. No. 4,025,268 to Taylor, discloses a molding apparatus to form flash-free articles by use of a two-piece, multi-cavity mold, with an independent closure and injection mechanism.

Similar devices are disclosed in U.S. Pat. Nos. 4,548,573; 3,632,245; 1,840,438; 2,780,832 and 2,983,983.

SUMMARY OF THE INVENTION

I have invented a confection molding machine having a support stand with an inlet end and an outlet end and a sprocket assembly journaled at each of these ends. A horizontal conveyor support member extends a predetermined distance from the outlet end toward the inlet end and an endless conveyor is carried by the sprocket assemblies. The endless conveyor has an upper processing string with a lower return string, and the upper processing string has a first unsupported section extending from the inlet end of the support stand to the conveyor support member, with a second section supported by the conveyor support member and extending from the unsupported section to the outlet end. The endless conveyor is preferably a pair of spaced, transfer chains.

A mold injection station is positioned on the support stand adjacent the inlet end and extends above the upper processing string. A plurality of mold assemblies are attached to the endless conveyor, and each mold assembly has two outwardly directed mold halves with a plurality of mold cavities defined in the outer surface of each mold half. Means for driving the endless conveyor are provided such that the mold assemblies are sequentially aligned with the mold injection station for placement of liquefied confection within the mold cavities.

In operation, the outer surfaces of the mold halves on adjacent mold assemblies join in abutting relationship with each other when traveling across the upper processing string. The abutting mold halves thus define a plurality of molds, with a clamping force applied to each mold when traveling over the unsupported section. The clamping force arises from the combined weight of the mold assemblies and the injected confection, which causes a deflection in the conveyor and this deflection is translated into a force bringing the abutting mold halves in closer contact with one another.

Thus, the molds of the present invention are self-clamping, eliminating the need for peripheral clamping devices required by the prior art, such as the spring-loaded rollers, etc. Furthermore, the molds are self-opening when passing around the outlet end of the machine, ejecting the molded confection figures and returning the mold assemblies for refilling without the need for human handling. The above advantages result in greatly increased efficiency of the confection molding process, along with substantially reduced labor costs and improved product quality.

DESCRIPTION OF THE PREFERRED EMBODIMENTS

Figure 1:
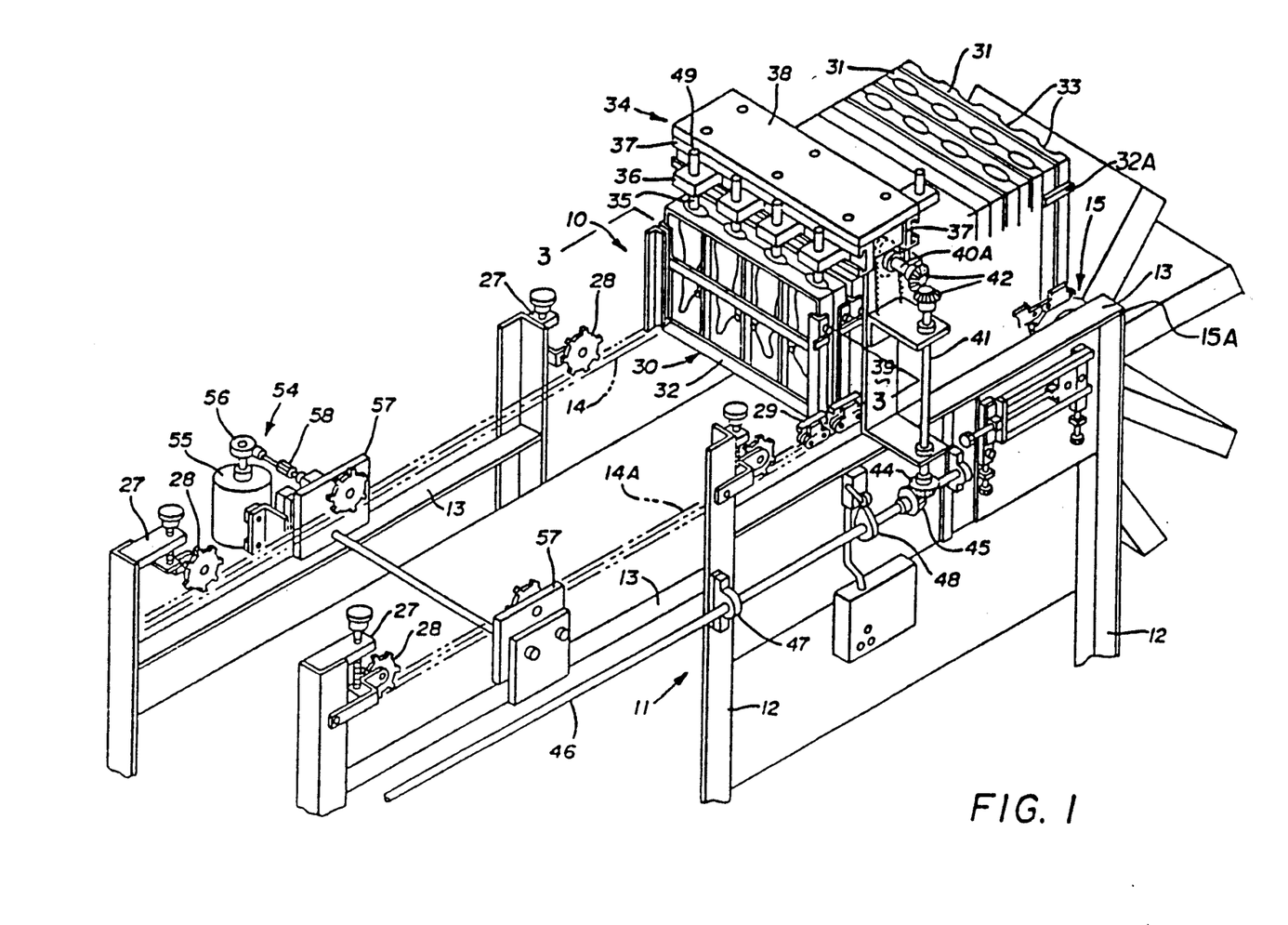
FIG. 1 is a perspective view of an inlet portion of a confection molding machine during injection of mold cavities.
Figure 2:
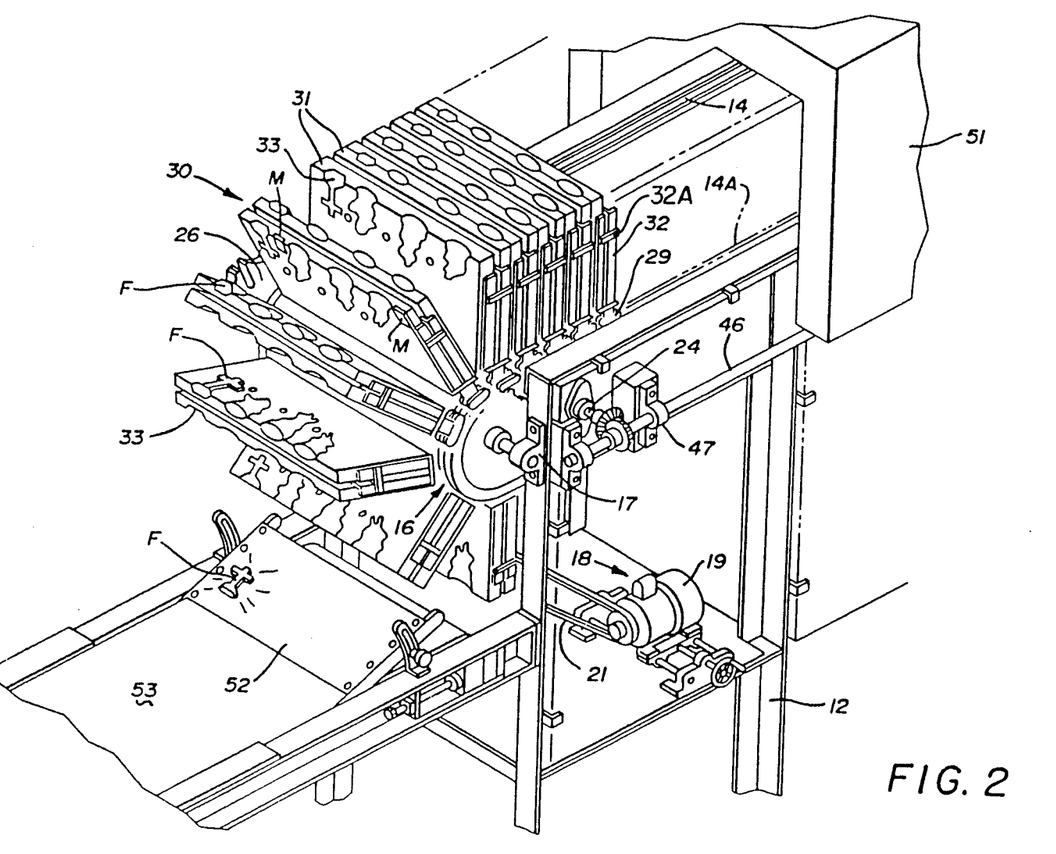
FIG. 2 is a perspective view of an outlet portion of the confection molding machine of FIG. 1 during unmolding of completed confection figures.
Figure 3:
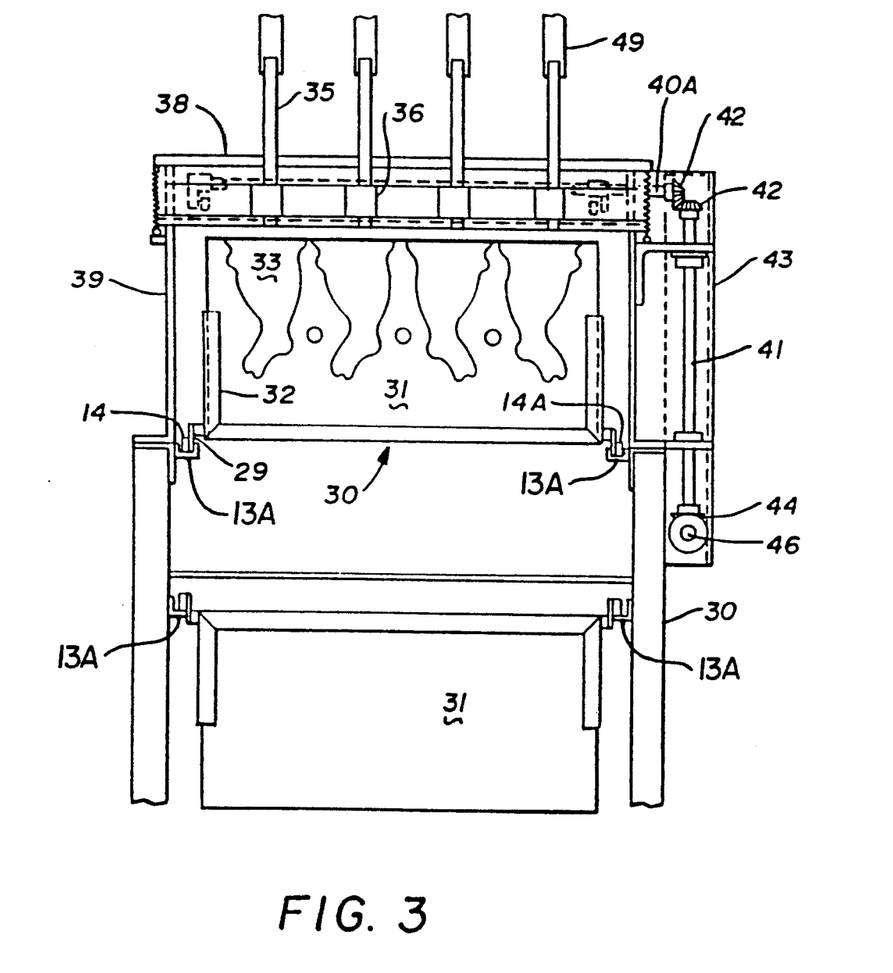
FIG. 3 is a sectional view taken along lines 3—3 of FIG. 1.
Figures 4, 6:
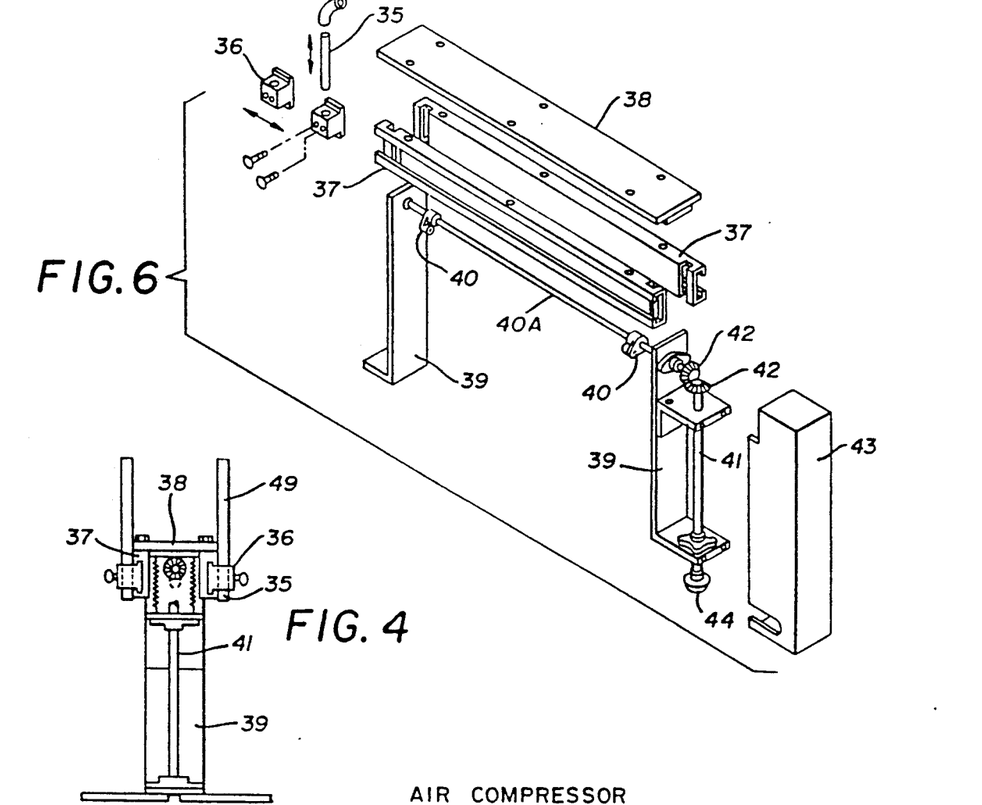
FIG. 4 is an end view of an injection nozzle support frame.
FIG. 6 is an exploded perspective view of the injection nozzle assembly.
Figure 5:
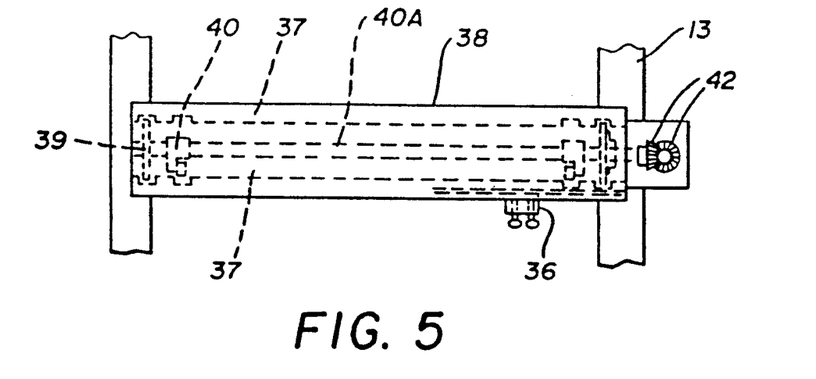
FIG. 5 is a top view of the injection nozzle support frame of FIG. 4.
Figure 9:
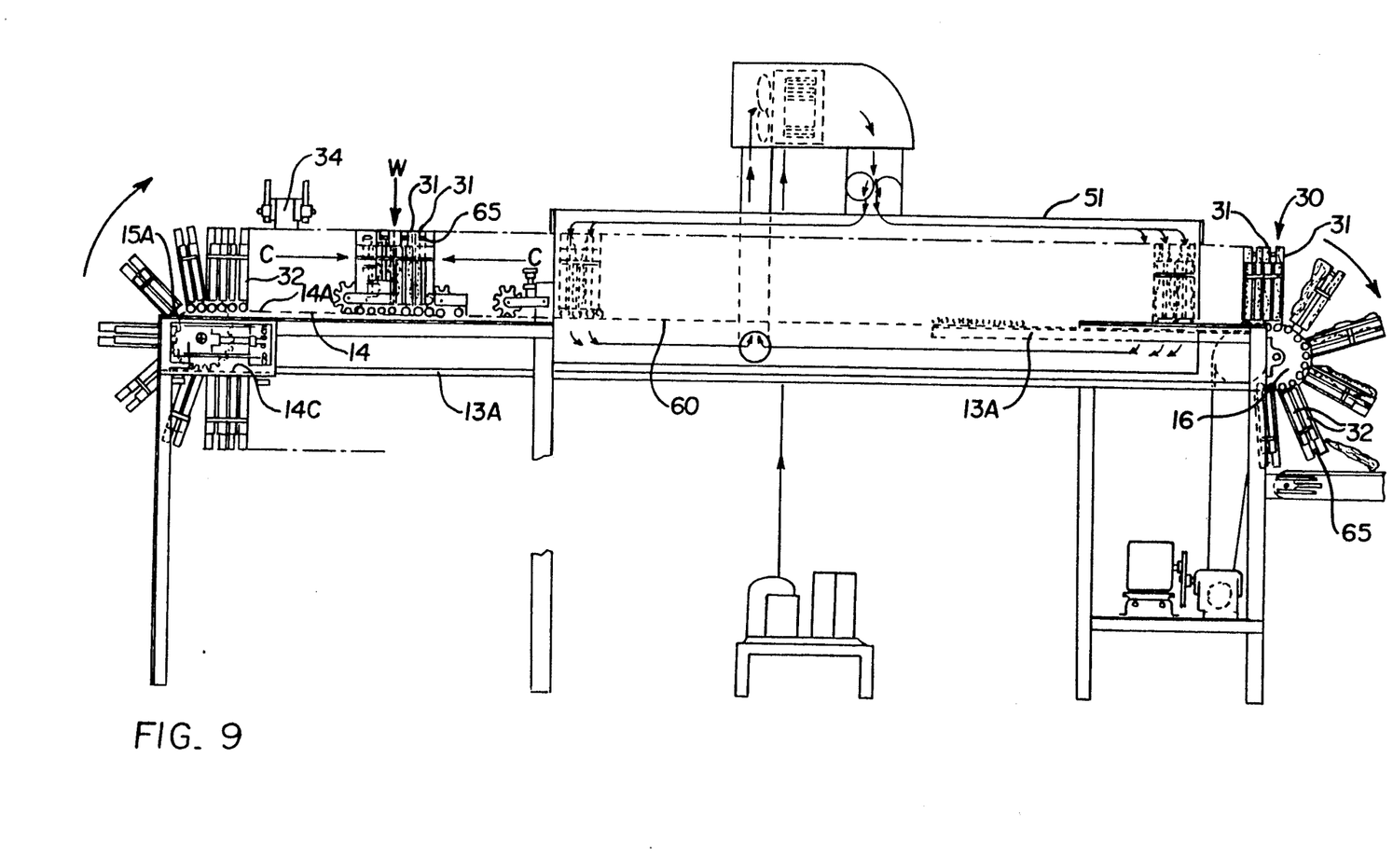
FIG. 9 is a side view of the confection molding machine of the present invention, taken from a side of the machine opposite that shown in FIG. 1.

Referring to FIGS. 1 and 2 of the drawings, a confection molding machine 10 is shown comprising an elongated support stand 11 having multiple pairs of vertically aligned support legs 12 and a plurality of interconnecting transverse and longitudinally extending support frame members 13. A pair of endless transfer chains 14 and 14A having an upper processing string 14B and a lower return string 14C are positioned in spaced relation to one another on the support stand 11. Transfer chains 14 and 14A extend between a pair of oppositely disposed axle sprocket assemblies 15 and 16, which are rotatably secured adjacent respective ends of the support stand 11 on journal brackets 17. A pair of chain support members 13A extend rearwardly from an outlet end 16A of the support stand toward an inlet end 15A as shown in FIGS. 3 and 9. The chain support members which underlie the upper processing string 14B terminate at a predetermined distance from the outlet end while those which underlie the lower return string 14C extend the length of support stand 11.

Figure 8:
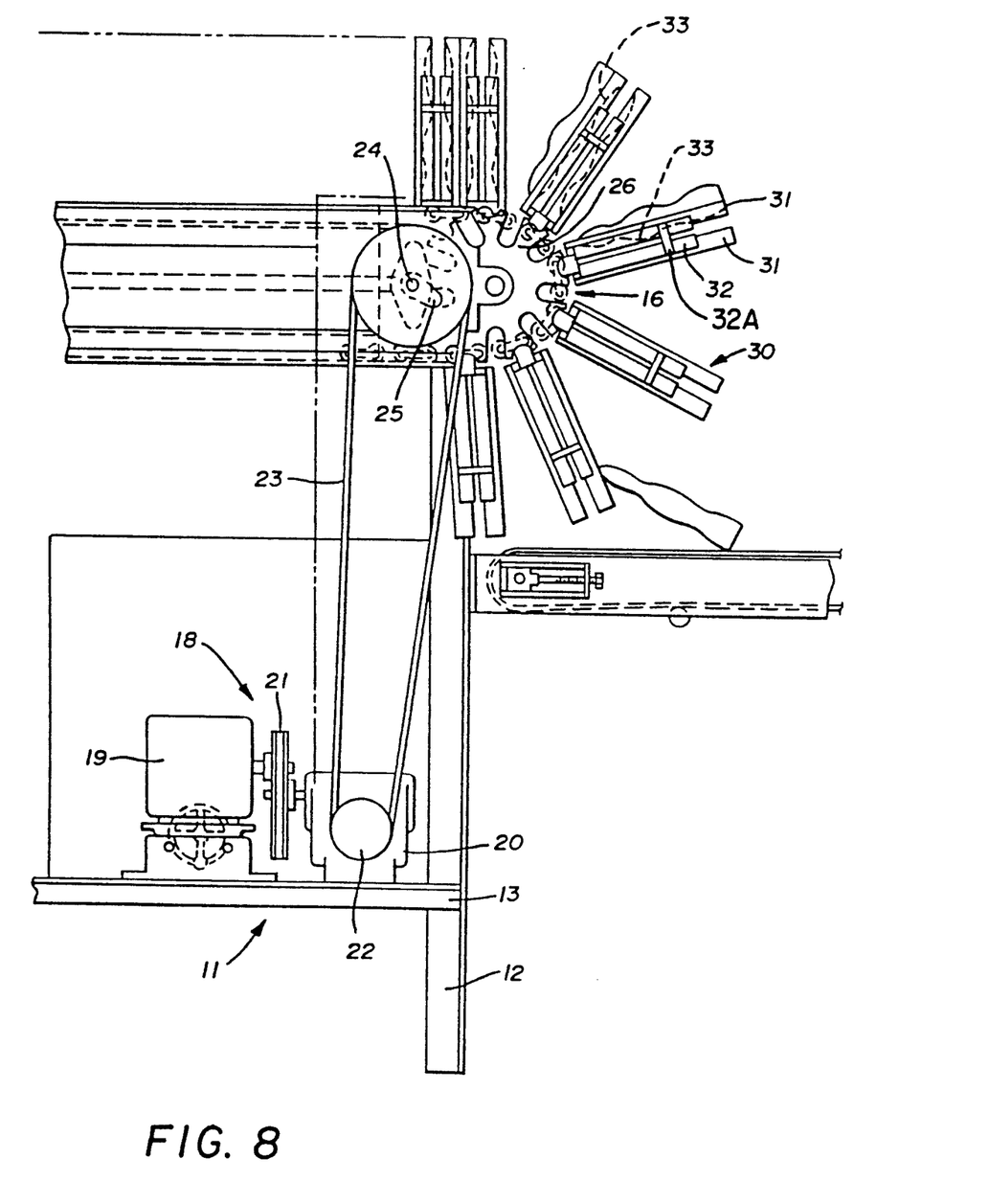
FIG. 8 is an enlarged side view of a drive and sequencing mechanism associated with the confection molding machine.

A chain drive motor assembly 18 can be seen in FIG. 8 of the drawings comprising a drive motor 19 and gear reduction box 20. A drive belt 21 extends between the drive motor 19 and the gear box 20 which has a final drive sprocket 22 extending therefrom. A drive chain 23 extends from the sprocket 22 to a power shaft 24 having a drive cam assembly 25 which engages a Geneva gear 26 on the axle sprocket assembly 16. A series of longitudinally spaced pairs of chain guides 27 are positioned along the support stand 11 with adjustable chain-engageable sprockets 28 to maintain positioning and tension on the endless transfer chains.

A plurality of mold support lugs 29 are secured to the endless transfer chains 14 and 14A and receive confection mold assemblies 30 therebetween. Each of the mold assemblies 30 includes a pair of multi-cavity mold halves 31 that are held in spaced, aligned position to one another by a mold bracket 32 which is in turn secured to opposite mold support lugs 29 on their respective endless transfer chains 14 and 14A. Removable tie bars 32A extend between adjacent I-brackets 32. Each of the multi-cavity mold halves 31 face outwardly so that independent mold cavities 33 are on the outer surface of each mold half 31. Since the multiple cavity mold halves 31 are so arranged, it is evident that to form a complete confection mold, adjacent mold halves 31 will abut one another on the endless transfer chains 14 and 14A as best seen in FIGS. 1, 8 and 9 of the drawings. Several mold assemblies have been omitted from these Figs. for clarity.

Referring to FIGS. 10-13, a pair of abutting mold halves in accordance with a second embodiment of the invention is shown. In this embodiment, spacers 65 are projecting from an inner surface of each mold half to provide clearance 65A between the mold halves on each mold assembly for passage of cooling air around the molds. Cooling air is applied to the molds in cooling tunnel 51, as shown in FIG. 9.

A mold injection station 34 can be seen in FIGS. 1, 3, 4, 5 and 7 of the drawings positioned across the endless chains 14 and 14A inwardly from the axle sprocket assembly 15 on the support stand 11. A plurality of injection nozzles 35 in their respective nozzle blocks 36 are revocably secured in a pair of slotted support bars 37 held in spaced, parallel relation to one another by a mounting plate 38. The slotted support bars 37 are vertically supported in spaced relation to the endless transfer chains 14 and 14A by apertured brackets 39 at either end thereof as best seen in FIG. 6 of the drawings.

A pair of lift cams 40, engageable on the mounting plate 38 upon rotation, are secured on a rotation shaft 40A extending between said apertured brackets 39.

Rotation of the shaft 40A is accomplished by a vertically aligned drive shaft 41 and matched, beveled gears 42 on the adjacent ends of said rotation and drive shafts 40A and 41, respectively. A shaft and gear cover 43 is provided. The lower end of the vertically aligned drive shaft 41 has a beveled gear 44 which is driven by a matching beveled gear 45 on a horizontally aligned drive shaft 46 extending along and secured to the overall length of the support table 11 via journaled brackets 47, best seen in FIG. 1 of the drawings. The drive shaft 46 is driven by the power shaft 24 heretofore described. The drive shaft 46 has several activation cams 48 along its length to energize the injection nozzles 35 in sequential operation as required. Upon rotation of the lift cams 40, the injection nozzles 35 and associated support structure lift after a confection fill cycle, which is required to de-tail the confection injection into the respective independent mold cavities 33.

Figure 7:
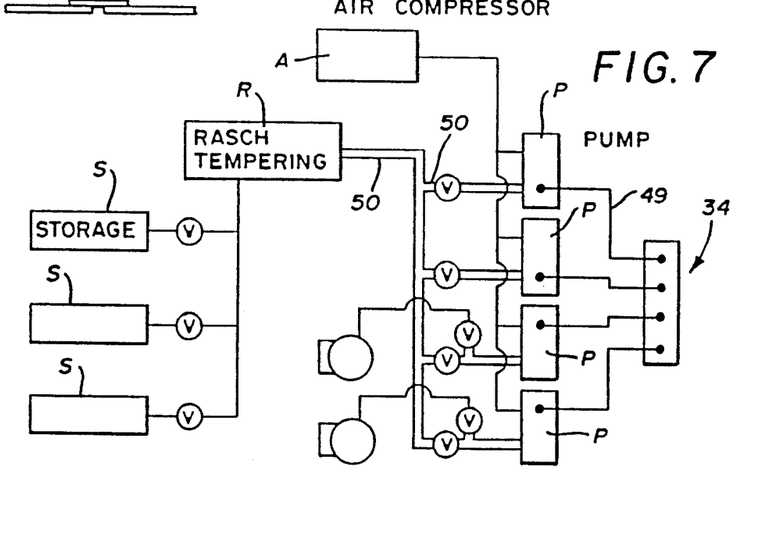
FIG. 7 is a block diagram of the product path to the injection nozzle assembly.

Each of the injector nozzles 35 is connected to a dedicated commercial pump P via a flexible supply line 49, best seen in FIG. 7 of the drawings. Each of the commercial pumps P is supplied with melted confection material (such as chocolate) which is primarily held in multiple heat storage containers S supplying a main rasch tempering vat R. Valves V are positioned on various interconnecting supply lines 50 to control and direct the flow of melted confection to the commercial confection pumps P. A compressed air supply line A is used to drive the commercial confection pumps P upon activation via a predetermined time sequence in accordance with the position of each mold assembly 30 on the endless transfer chains 14 and 14A.

Figure 10:
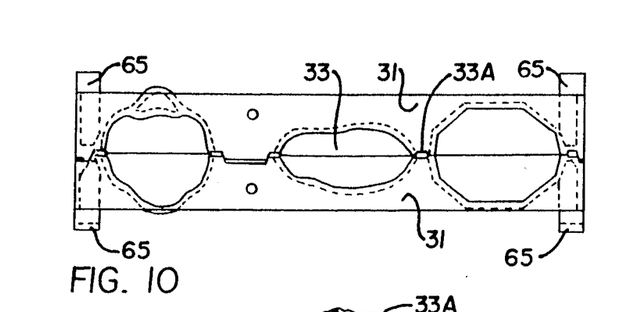
FIG. 10 is a top view of a pair of abutting mold halves in accordance with a second embodiment of the invention.
Figure 11:
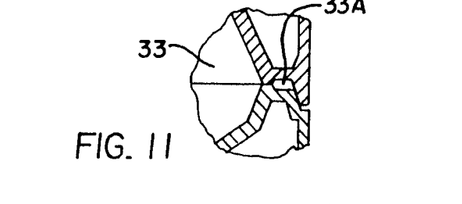
FIG. 11 is an enlarged view of the encircled area of FIG. 10.
Figure 12:
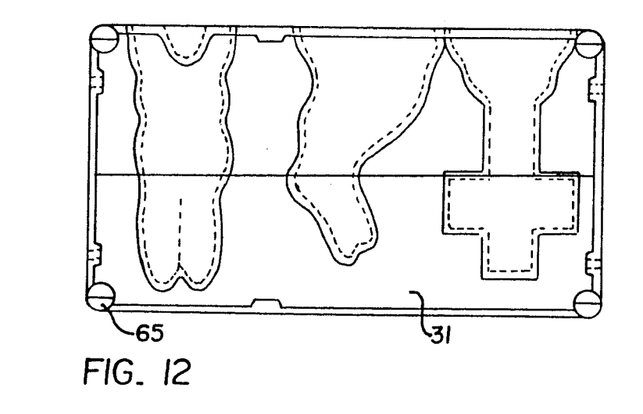
FIG. 12 is a side view of the mold halves of FIG. 10.
Figure 13:
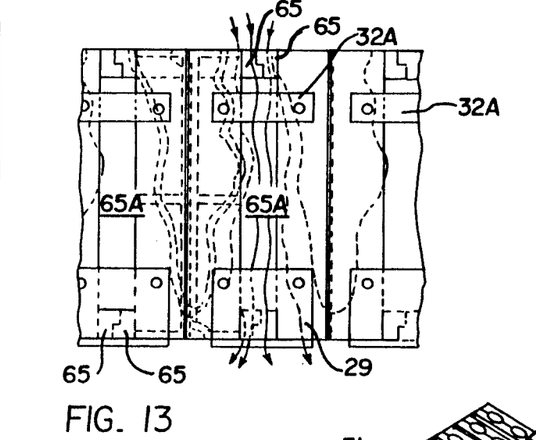
FIG. 13 is an end view of the mold halves of FIG. 10.
Figure 14:
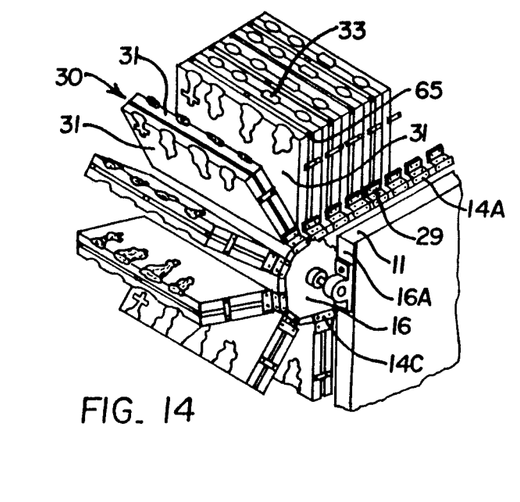
FIG. 14 is a perspective view of the outlet portion of the confection molding machine, utilizing the molds of the second embodiment.

In operation, as seen in FIGS. 1, 2, 3, 8 and 9, the mold assemblies 30 travel along an upper processing string of endless transfer chains 14 and 14A during injection, cooling and unmolding, then return along a lower return string of the endless transfer chains 14 and 14A to be repositioned for injection. Specifically, after the molds have been injected with confection, they travel across an unsupported section 60 (FIG. 9) of the upper processing string through a cooling tunnel 51 (seen in FIG. 2). Corresponding mold halves 31 on adjacent mold assemblies 30 join in abutting relationship with each other as each mold assembly passes over the upper processing string. Particularly, as each mold is injected with confection, the weight W of the mold assemblies along with the weight of the confection causes the transfer chains to deflect downward in the unsupported section 60 of the chains 14, 14A. Due to the abutting relationship of the mold assemblies and the rigidity of mold brackets 32, this slight deflection is translated into a clamping force C between corresponding mold halves. The clamping effect provides sufficient pressure on the molds to insure proper set-up of the confection and also minimizes flashing, or product build up, around the mold perimeters. To further minimize flashing, a channel 33A may be provided around the perimeter of each mold cavity, adjacent each cavity's contact edge, as shown in FIG. 10.

As the mold assemblies 30 travel around the respective axle and sprocket assemblies 15 and 16, they separate to open the mold cavities 33. Thus, each opened mold assembly ejects a cooled, molded confection figure F therefrom, without the need for human handling. The figures fall onto a resilient catch pad 52 which is inclined to direct the ejected confection figures onto a conveyor belt 53, removing the figures for additional processing.

Referring back to FIG. 1, a vibrator assembly 54 is seen comprised of an electric motor 55 and a cam 56, with a pair of interconnected chain engagement pads 57. An adjustable linkage 58 extends between the cam 56 and one of the pads 57. The vibrating assembly 54 vibrates the mold assembly 30 after filling with confection to reduce air infiltration and assure proper fill density of the mold cavities 33, as is well-known and understood in the art. A predetermined control sequence is used to determine the rate of advancement of the endless transfer chains 14 and 14A to properly position mold assemblies 30 under the injection nozzles 35 and correspondingly activate the injector pumps P, as described above.

This particular arrangement of independent, dedicated confection pumps P with associated injection nozzles 35 and mold assemblies 30, will allow different types of confection to be used, as well as a large variety of different mold cavity shapes and quantities during a normal production run. Specialized or small quantity confection figures are possible within the flexibility of the confection molding machine of this invention.

Having described the presently preferred embodiments of the invention, it will be understood that it is not intended to limit the invention except within the scope of the following claims.

I claim:

1. A confection molding machine, comprising:
   a support stand having an inlet end and an outlet end with a sprocket assembly journaled at each of said ends and with a conveyor support member extending a first distance from said outlet end toward said inlet end;
   an endless conveyor having an upper processing string and a lower return string carried by said sprocket assemblies, said upper processing string having an unsupported section extending a second distance from the inlet end of said support stand to said conveyor support member, and a supported section extending said first distance from the unsupported section to the outlet end, said conveyor support member disposed beneath said supported section;
   a mold injection station positioned on said support stand adjacent said inlet end and extending above said upper processing string;
   a plurality of mold assemblies attached to said endless conveyor, each mold assembly having two outwardly directed mold halves with a plurality of mold cavities defined in an outer surface of each mold half, the mold halves on adjacent mold assemblies joining in abutting relationship with each other when traveling across said upper processing string to define a plurality of molds;
   means for driving said endless conveyor such that said mold assemblies are sequentially aligned with said mold injection station for placement of liquefied confection within said mold cavities;
   said unsupported section defining means for applying a clamping force to said molds when traveling over said unsupported section due to the combined weight of the mold assemblies and the injected confection.

2. The confection molding machine of claim 1 wherein said endless conveyor comprises a pair of spaced transfer chains having lugs thereon for carrying said mold assemblies.

3. The confection molding machine of claim 2 including a plurality of sprocketed chain guides on said support stand above the unsupported section of said transfer chains for maintaining uniform spacing between said chains.

4. The confection molding machine of claim 2 wherein each lug has a pair of spaced L-brackets extending upward therefrom for supporting said mold halves, the mold halves on each mold assembly thereby spaced to provide clearance for passage of cooling air around said molds.

5. The confection molding machine of claim 4 including a removable tie bar extending between adjacent L-brackets.

6. The confection molding machine of claim 1 including a plurality of spacers projecting from an inner surface of each mold half to provide clearance between the mold halves on each mold assembly for passage of cooling air around said molds.

7. The confection molding machine of claim 1 wherein abutting mold halves further define a channel around each mold cavity directly adjacent a contact edge for each mold cavity to prevent flashing.

8. A confection molding machine, comprising:
   a support stand having an inlet end and an outlet end with a sprocket assembly journaled at each of said ends and with a conveyor support member extending a first distance from said outlet end toward said inlet end;
   a pair of spaced, endless transfer chains engaged on said sprocket assemblies and having an upper processing string and a lower return string, said upper processing string having an unsupported section extending a second distance from said inlet end to said chain support members and a supported section extending said first distance from said unsupported section to said outlet end, said conveyor support member disposed beneath said supported section;
   a mold injection station positioned on said support stand adjacent said inlet end and extending above said upper processing string;
   a plurality of mold assemblies attached to said endless conveyor, each mold assembly having two outwardly directed mold halves with a plurality of mold cavities defined in an outer surface of each mold half, the mold halves on adjacent mold assemblies joining in abutting relationship with each other when traveling across said upper processing string to define a plurality of molds;
   means for driving said endless transfer chains such that said mold assemblies are sequentially aligned with said mold injection station for placement of liquefied confection within said mold cavities;
   said unsupported section defining means for applying a clamping force to said molds when traveling over said unsupported section due to the combined weight of the mold assemblies and the injected confection.

9. The confection molding machine of claim 8 including lugs on said endless transfer chains for carrying said mold assemblies, each lug having a pair of spaced L-brackets extending upward therefrom for supporting said mold halves, the mold halves on each mold assembly thereby spaced to provide clearance for passage of cooling air around said molds.

10. The confection molding machine of claim 9 including a removable tie bar extending between adjacent L-brackets.

11. The confection molding machine of claim 8 including a plurality of spacers projecting from an inner surface of each mold half to provide clearance between the mold halves on each mold assembly for passage of cooling air around said molds.

12. The confection molding machine of claim 8 wherein abutting mold halves further define a channel around each mold cavity directly adjacent a contact edge for each mold cavity to prevent flashing.

13. The confection molding machine of claim 6 including a tie bar on each mold assembly joining said mold halves.

14. The confection molding machine of claim 11 including a tie bar on each mold assembly joining said mold halves.

* * * * *